(No Model.) 2 Sheets—Sheet 1.

W. E. TAFT.
TOOL FOR MAKING PEARL BUTTONS, &c.

No. 487,233. Patented Nov. 29, 1892.

WITNESSES.
S. Scholfield
Chas. F. Schmelz

INVENTOR.
Walter E. Taft.

(No Model.) 2 Sheets—Sheet 2.
W. E. TAFT.
TOOL FOR MAKING PEARL BUTTONS, &c.
No. 487,233. Patented Nov. 29, 1892.
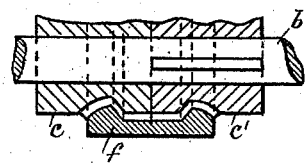
FIG. 4.
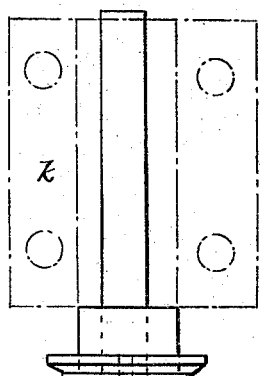
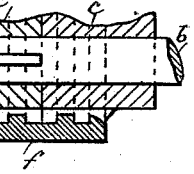
FIG. 5.
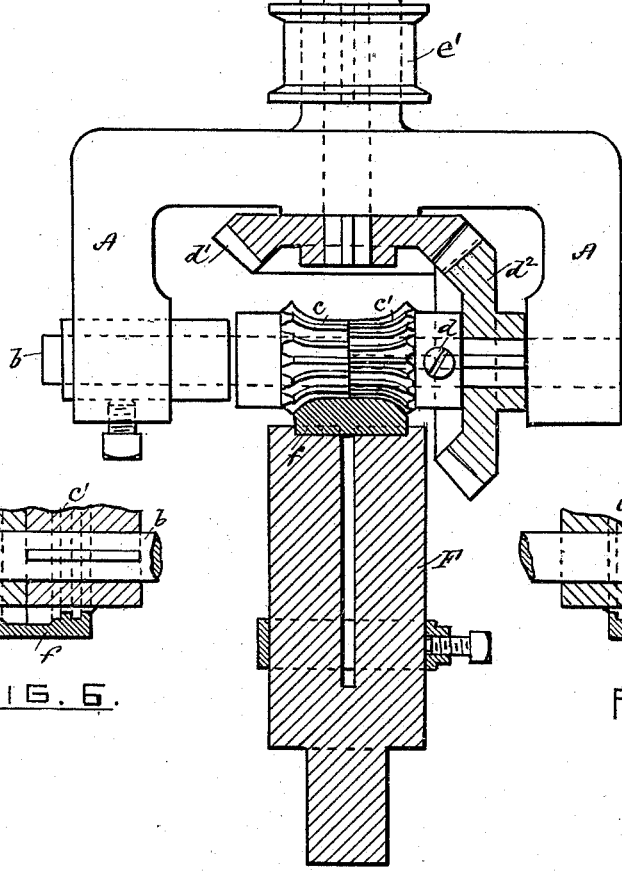
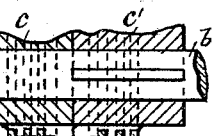
FIG. 6. FIG. 7.
FIG. 3.
WITNESSES. INVENTOR.
S. Scholfield Walter E. Taft
Chas. F. Schmelz

UNITED STATES PATENT OFFICE.

WALTER E. TAFT, OF PROVIDENCE, RHODE ISLAND, ASSIGNOR, BY MESNE ASSIGNMENTS, TO THE ANCHOR PEARL COMPANY, OF SAME PLACE.

TOOL FOR MAKING PEARL BUTTONS, &c.

SPECIFICATION forming part of Letters Patent No. 487,233, dated November 29, 1892.

Application filed July 22, 1891. Serial No. 400,342. (No model.)

*To all whom it may concern:*

Be it known that I, WALTER E. TAFT, a citizen of the United States, residing at Providence, in the county of Providence and State of Rhode Island, have invented a certain new and useful Improvement in Tools for Making Pearl, Stone, or Shell Buttons and Similar Articles; and I do hereby declare the following to be a clear and exact description of the invention, such as will enable others skilled in the art to which it appertains to make and use the same.

My invention pertains to certain new and useful improvements in tools for forming the shape of pearl, stone, and shell buttons and similar articles, having for its object the provision of simple and highly-efficient means for readily and easily cutting the substance to be operated upon.

The invention therefore comprises the details of construction, combination, and arrangement of parts substantially pointed out in the claims.

Figure 1:
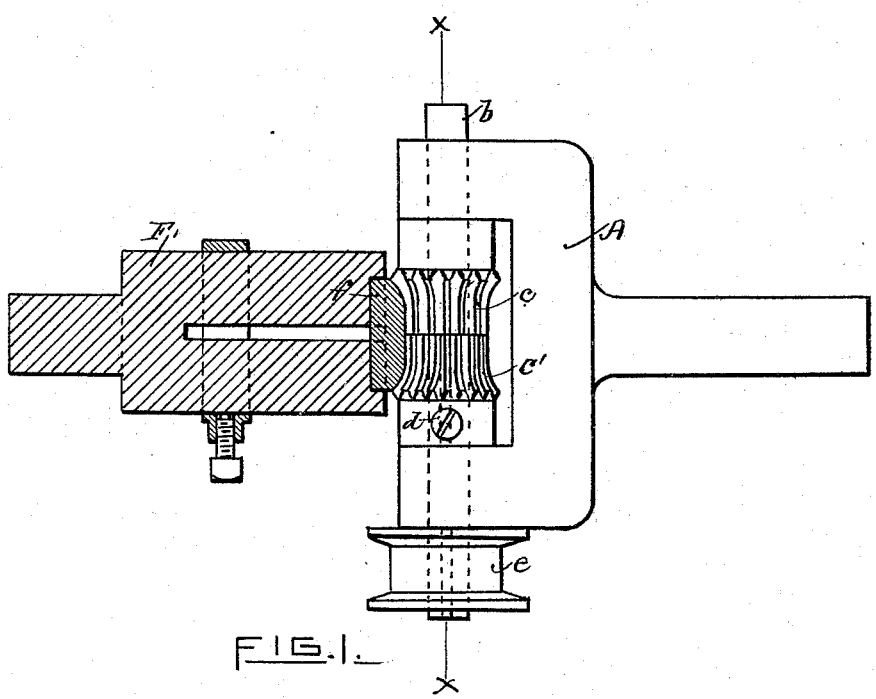
Figure 2:
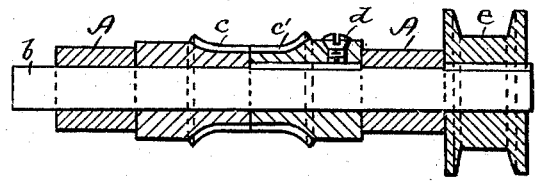

In the accompanying drawings, Figure 1 is a plan view of my invention. Fig. 2 is a sectional view taken in the line $x\,x$ of Fig. 1. Fig. 3 is a plan view of a modification of my invention. Figs. 4, 5, 6, and 7 are sectional views showing different shapes of the cutters for forming the buttons.

Referring to the drawings, Fig. 1, A designates the tool-holder, preferably made of iron in one solid piece. The shaft $b$ is journaled in the holder, and upon the said shaft are placed the conical cutters or tools $c\,c'$, one of said cutters $c'$ being fastened to said shaft by the screw $d$ and the other left loosely thereon, the shaft being driven by means of the pulley $e$.

F represents a wooden chuck for holding the button $f$, the said chuck F being made to revolve, as usual, and in forcing the cutters against the button the cutter $c'$ is driven at a rapid speed for the purpose of smoothing the button, and the button revolving against the cutter $c$ causes the cutter $c$ to revolve and have a hacking or chipping action upon the surface of the button, causing the substance to chip off, while the cutter $c'$ finishes the surface, and this comprises one mode of carrying out my invention.

Referring to Fig. 3, A A is the frame for holding the cutters $c$ and $c'$, and in this view the frame for holding the cutters is made to revolve and motion is given to the cutters by means of the bevel-gears $d'$ and $d^2$, the shaft of the bevel-gear $d'$ being held stationary within the block $k$, which is to be attached to a slide-rest, the bevel-gear $d^2$ being thus made to revolve around the gear $d'$, and the said frame or holder A is driven by a pulley $e'$, so that by the use of this construction the button can be held stationary, if desired, as the cutters or tools revolve about an axis in line with the axis of the button, and at the same time revolve upon their own axes.

These cutters or tools can be used in a common speed-lathe screw-machine or any special turning-lathe, upright drills, or, in fact, any machine where the tool can be held on a line with the work to be operated upon. Therefore I do confine myself to any particular construction of a machine for using the tools.

In Figs. 4, 5, 6, and 7 I show different shapes of cutters for making different designs of work, as I do not confine myself to any particular design in the form of the cutters.

I claim as my invention—

1. The combination, with a chuck adapted to hold the blank for revolution, of the positively-driven smoothing-cutter arranged at one side of the line of the axis of the chuck and the loose chipping-cutter arranged at the opposite side and made to rotate by pressure against the surface of the revolving blank, substantially as described.

2. The combination, with the chuck adapted to hold the blank, of the cutter-holder adapted for revolution upon its axis, the positively-driven smoothing-cutter arranged at one side of the axis of the holder and the loose chipping-cutter arranged at the opposite side, and means for revolving the cutter-holder, substantially as described.

3. The combination, with a chuck adapted to hold the blank for revolution, of the cutter-shaft, the cutters one of which is tight and the other loose upon the shaft and arranged at opposite sides of the line of the axis of the chuck, and means for revolving the shaft and the attached cutter while the loose cutter is being revolved by contact with the surface of the blank, substantially as described.

4. The combination, with the cutter-holder and the shaft arranged transversely of the axis of the holder, of the cutters one of which is tight and the other loose upon the shaft and arranged upon the shaft at opposite sides of the line of the axis of the holder, and means for revolving the said holder and shaft, substantially as described.

5. The combination, with the chuck adapted to hold the blank for revolution, of the cutter-holder, the shaft arranged transversely of the axis of the holder, the cutters one of which is tight and the other loose upon the shaft and arranged at opposite sides of the line of the axis of the chuck, and means for revolving the shaft and the attached cutter while the loose cutter is being revolved by contact with the surface of the blank, substantially as described.

WALTER E. TAFT.

Witnesses:
S. SCHOLFIELD,
J. J. SCHOLFIELD.